United States Patent [19]

Collins

[11] Patent Number: 5,257,684

[45] Date of Patent: Nov. 2, 1993

[54] COUPLING ASSEMBLY

[75] Inventor: Marcus H. Collins, Akron, Ohio

[73] Assignee: Eaton Corporation, Cleveland, Ohio

[21] Appl. No.: 963,568

[22] Filed: Oct. 19, 1992

[51] Int. Cl.$^5$ .................................. F16D 67/04
[52] U.S. Cl. .................. 192/18 A; 192/12 C; 192/85 A
[58] Field of Search ............... 192/18 A, 12 C, 85 A, 192/85 AA

[56] References Cited

U.S. PATENT DOCUMENTS

| | | | |
|---|---|---|---|
| 4,194,606 | 3/1980 | Beneke | 192/18 A |
| 4,463,841 | 8/1984 | Kelley | 192/18 A |
| 4,567,965 | 2/1986 | Woodruff | 192/18 A X |
| 4,567,971 | 2/1986 | Hille et al. | 192/12 C |
| 4,648,494 | 3/1987 | Yater | 192/18 A |
| 4,676,351 | 6/1987 | Miles et al. | 192/12 C X |
| 4,785,926 | 11/1988 | Matson | 192/18 A |
| 4,807,731 | 2/1989 | Collins | 192/18 A |
| 4,848,527 | 7/1989 | Kamio | 192/18 A X |
| 4,874,068 | 10/1989 | Collins et al. | 192/18 A |
| 4,967,885 | 11/1990 | Arbjerg et al. | 192/12 C X |
| 5,046,593 | 9/1991 | Collins et al. | 192/18 A |

Primary Examiner—Leslie A. Braun
Assistant Examiner—Andrea Pitts
Attorney, Agent, or Firm—Tarolli, Sundheim & Covell

[57] ABSTRACT

An improved coupling assembly includes a combined clutch and brake assembly. Springs are provided to urge the brake assembly to an engaged condition. A first pressure chamber holds fluid pressure to assist the springs in urging the brake assembly toward the engaged condition. A second chamber holds fluid pressure to urge the clutch assembly toward the engaged condition and to urge the brake assembly away from the engaged condition. Fluid is supplied at a relatively low pressure through the first chamber to provide for a controlled actuation of the brake assembly to the engaged condition under the combined influence of the springs and the pressure in the first chamber and to provide for the transmission of a controlled amount of braking torque when the brake assembly is engaged. Fluid is supplied to the second chamber at a higher pressure to overcome the influence of the springs and operate the clutch assembly to the engaged condition. A quick release valve arrangement is provided in association with the second chamber to enable the fluid pressure to be quickly exhausted from the second chamber and the brake assembly engaged.

6 Claims, 1 Drawing Sheet

COUPLING ASSEMBLY

BACKGROUND OF THE INVENTION

The present invention relates to a new and improved coupling assembly and more specifically to a coupling assembly which includes a brake assembly and a clutch assembly which are actuated to control the rotation of an output member.

A coupling assembly having a clutch assembly and a brake assembly which are sequentially actuated to control the rotation of an output member is disclosed in U.S. Pat. No. 4,807,731 issued Feb. 28, 1989 and entitled "Clutch and Brake Assembly". Coil springs resiliently bias the brake assembly toward an engaged condition. Fluid pressure is conducted to a first chamber to operate the brake assembly from the engaged condition to a disengaged condition against the influence of the coil springs. The fluid pressure in the first chamber also operates the clutch assembly from a disengaged condition to an engaged condition.

When the clutch assembly disclosed in the aforementioned U.S. Pat. No. 4,807,731 is to be disengaged and the brake assembly engaged, the fluid pressure which previously operated the clutch assembly to the engaged condition is vented to the atmosphere. The coil springs then operate the brake assembly to an engaged condition. Fluid pressure is conducted to a second chamber to assist the coil springs in disengaging the clutch assembly and engaging the brake assembly.

Coupling assemblies having this general construction have been used with machines which are operated at relatively high rates and particularly with can forming machines. It has previously been suggested that quick release exhaust valves could be utilized in association with the coupling chamber which is pressurized to operate the brake assembly to the disengaged condition and to engage the clutch assembly. Thus, U.S. Pat. No. 4,874,068 issued Oct. 17, 1989 and entitled "Clutch and Brake Rapid Exhaust Manifold" indicates that a coupling assembly can be used with a machine having operating rates as high as 300 to 400 cycles per minute when quick release valve assemblies are utilized to effect rapid depressurization of the chamber which is pressurized to operate the clutch assembly to the engaged condition and the brake assembly to the disengaged condition.

It has been found that the coupling assemblies of the prior art operate satisfactorily in association with machines which operate at rates as high as 300 to 400 cycles per minute. It is believed that premature failure of machines which have higher operating rates may be caused by the application of excessive torque to the machine input shaft and coupling when the brake assembly is operated from the disengaged condition to the engaged condition under the combined influence of the biasing springs and fluid pressure in the manner disclosed in the aforementioned U.S. Pat. No. 4,807,731. Under certain circumstances, the application of excessive brake torque can result in breakage of the input shaft to a machine which is driven through the coupling assembly.

SUMMARY OF THE INVENTION

A coupling assembly constructed in accordance with the present invention includes a brake disc which is maintained stationary and a cluth disc which is adapted to be constantly rotated. A brake element is engageable with the brake disc to hold an output member against rotation. A clutch element is engageable with the clutch disc to transmit force to rotate the output member. The brake element is urged toward the brake disc and the clutch element is urged away from the clutch disc by a biasing spring. Fluid pressure is conducted to a first chamber to assist the biasing spring in urging the brake element toward the brake disc and the clutch element away from the clutch disc. Fluid pressure is conducted to a second chamber to urge the clutch element toward the clutch disc and to urge the brake element away from the brake disc against the influence of the biasing spring.

Fluid is supplied at a first pressure to the first chamber by a first fluid pressure supply to assist the spring in urging the brake element toward the brake disc. A second fluid pressure is supplied to the second chamber to urge the clutch element toward the clutch disc and to urge the brake element away from the brake disc against the influence of the biasing spring. The second fluid pressure is greater than the first fluid pressure to prevent engagement of the brake element with the brake disc under the influence of excessive force provided by the combined effect of the biasing spring and the fluid pressure in the first chamber.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
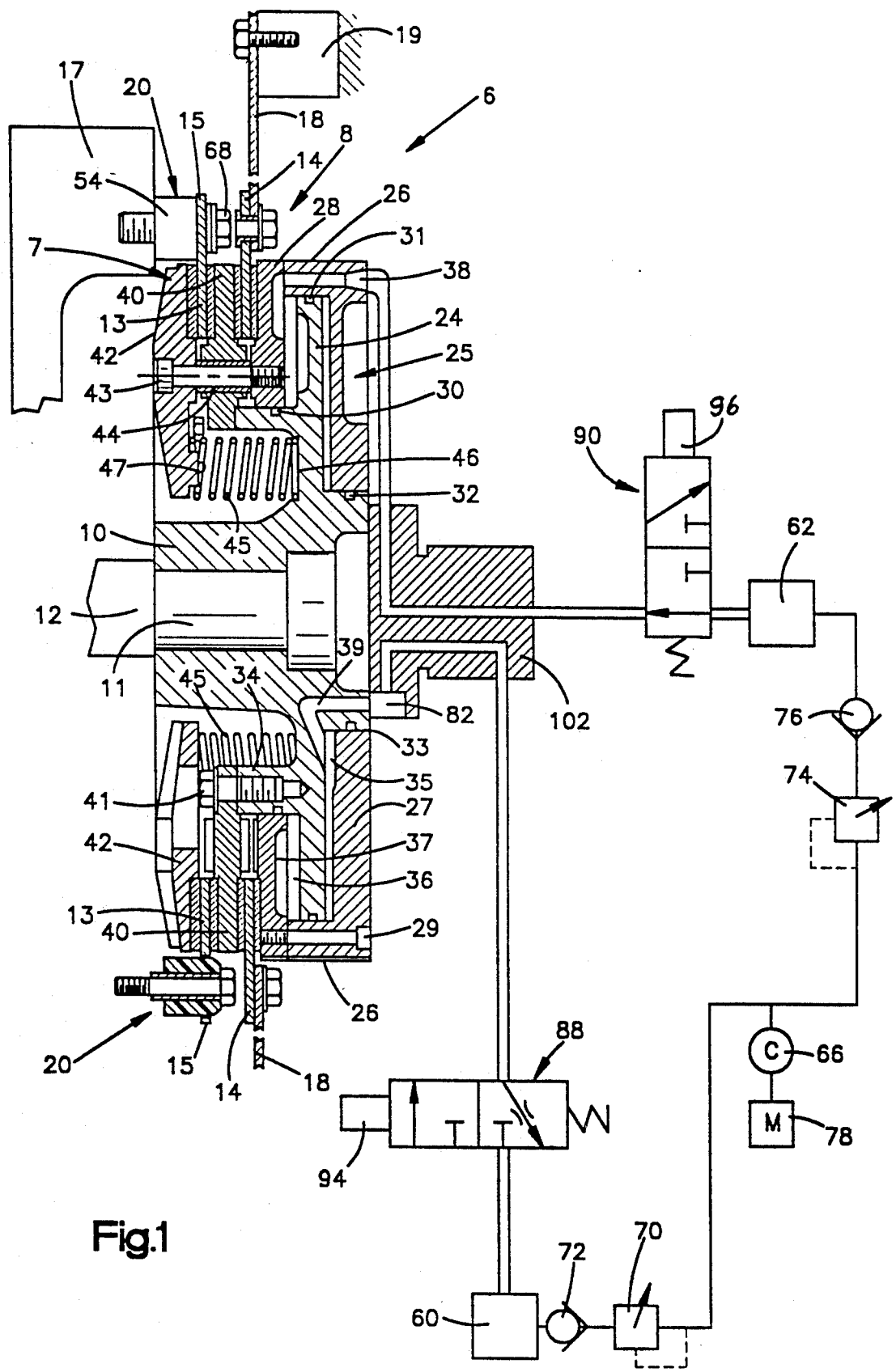
FIG. 1 is a schematic illustration of a coupling assembly having a brake assembly and a clutch assembly and illustrating the manner in which air is supplied at a relatively low fluid pressure to the brake assembly to effect operation of the brake assembly in an engaged condition and is supplied at a relatively high fluid pressure to a clutch assembly to effect operation of the clutch assembly to an engaged condition.

The illustrated embodiment of the invention is in conjunction with a coupling assembly 6 having the same general construction as the coupling assemblies disclosed in U.S. Pat. No. 4,807,731 issued Feb. 28, 1989 and entitled "Clutch and Brake Assembly" and U.S. Pat. No. 5,046,593 issued Sept. 10, 1991 and entitled "Coupling Assembly". The coupling assembly 6 includes a clutch assembly 7 and a brake assembly 8. The clutch assembly 7 and brake assembly 8 are connected with a hub 10 which is keyed, or otherwise fixed, to the input shaft 11 of a machine 12, typically, a can forming press, punch press or the like operating at high speed or duty cycles. The assembly is subjected to torque reversals via the shaft 11 in excess of 325 cycles per minute. During each revolution of the shaft 11, the torque load to which the shaft is subjected by the other components of the machine 12 varies between at least +12,500 and at most −2,500 pound inches. For example, the torque load may vary between +35,000 and −19,000 pound inches.

A clutch disc or coupling member 13 in the clutch assembly has a clutch plate 15 which is secured to a driving member 17 by connector assemblies 20. The driving member 17 is a flywheel which is continuously rotated in typical applications. A brake disc or coupling member 14 in the brake assembly 8 has reaction arms 18 connected to a stationary frame 19. Both faces of each of the discs 13 and 14 have a disc made of friction material which is riveted or otherwise secured to the faces of the disc 13 and 14.

The hub 10 is provided with an integrally formed fixed piston 24 extending radially from the hub which coacts with an annular axially movable cylinder, generally referred to by the numeral 25. The cylinder 25 is formed by an outer cylindrical portion 26, an annular radially extending portion 27 and an annular brake plate 28. Portion 26 is secured to the brake plate 28 by a plurality of bolts 29 extending through the portion 26. The piston 24 is provided with three annular seals 30, 31 and 32. The portions 26 and 27 and piston 24 cooperate to form a pressure or actuation chamber 35.

Another pressure or actuator chamber 36 is formed by the wall 37 of the brake plate 28 and the other side of the piston 24. Passageways 38 and 39 are provided in the portion 26 of the cylinder and the hub 10. On a side of the brake plate 28 opposite from the chamber 36 the brake plate has a flat annular friction surface which is engageable with a friction disc connected to the brake disc or coupling member 14.

An annular rotor or coupling member 40, which may be ventilated, is fixed to the piston flange 34 by a plurality of bolts 41 extending through holes in the radial inner portion so that the rotor 40 is spaced from brake plate 28 and is interposed between the clutch disc 15 and the brake disc 14. Since piston 24 is fixed to the hub and the rotor 40 is fixed to the piston, the rotor 40, piston 24, and hub 10 rotate together as a unit but do not move axially. The rotor or coupling member 40 has flat annular friction surfaces which are engageable with the friction discs 23 connected to the clutch disc 13 and brake disc 14.

An annular clutch plate or coupling member 42 is secured to the brake plate 28 by bolts 43 extending through spacer tubes 44 which space the clutch plate a predetermined distance from the brake plate 28 for engagement with the clutch disc 15. The clutch plate 42, brake plate 28 and the cylinder 25, move axially as a unit. A plurality of coil springs 45 are mounted between the clutch plate 42 and the piston 24. One end of each spring 45 is positioned in a depression 46 in the piston and the other end is positioned over a circular projection 47 formed on the face of the clutch plate to hold the springs in position. The clutch plate 42 has a flat annular friction surface which is engageable with the friction disc connected to the clutch disc 13.

The coupling assembly 6 operates to couple the machine shaft 11 to the driving member 17 when fluid pressure in the chamber 35 exceeds the pressure of the springs 45 and urges the clutch plate 42 to the right, as viewed in the drawing, toward the clutch disc to engage the friction discs, secured to the clutch disc, with the clutch plate 42 and the rotor 40. At the same time, the brake plate 28 moves to the right and is disengaged from the friction disc secured to the brake disc 14. The assembly acts in its braking mode when chamber 35 is depressurized. At the same time that chamber 35 is being depressurized, the chamber 36 is being pressurized which provides additional braking torque and causes the chamber 35 to be exhausted or depressurized faster than if the chamber 35 was depressurized only by the biasing forces of the springs 45 urging the cylinder portion 27 toward the piston 24.

In accordance with a feature of the present invention, the chamber 35 is pressurized with fluid at a higher pressure than the chamber 36. This results in the brake plate 28 being clamped against the brake disc 14 under the combined influence of the biasing springs 45 and the relatively low fluid pressure in the chamber 36. Urging the brake plate 28 toward the engaged condition under the influence of a relatively low fluid pressure in combination with the biasing springs 45 enables a controlled application of braking torque to the output shaft 11 to be obtained. This results in the rotation of the output shaft 11 being stopped under the influence of a torque which is not excessive even though it is provided by the combined effect of the biasing springs 45 and the fluid pressure in the chamber 36.

To provide for the conducting of fluid at different pressures to the chambers 35 and 36, chamber 35 is connected with a tank 60 which contains air at a relatively high pressure. To provide for conducting of fluid at a relatively low pressure to chamber 36, the chamber 36 is connected with a tank 62 which contains air at a relatively low pressure.

A single compressor 66 applies air pressure to both the tanks 60 and 62. The compressor 66 supplies air pressure to the tank 60 through an adjuster pressure regulator 70 and a check valve 72. The compressor 66 supplies air pressure to the tank 62 through an adjustable pressure regulator 74 and check valve 76. The compressor is driven by a motor 78.

Although the pressure regulators 70 and 74 can be set for many different pressures, in one specific embodiment of the invention, the pressure regulator 70 was set so that fluid from the compressor 66 was supplied to the tank 60 at a pressure of approximately 80 pounds per square inch. The pressure regulator 74 was set so that pressure was supplied to the tank 62 at a pressure of approximately 30 pounds per square inch. The specific values of the air pressures conducted to the tanks 60 and 62 can be varied in order to obtain a smooh and gradual movement of the brake plate 28 into engagement with the brake disc 14 under the combined influence of the springs 45 and the fluid pressure in the chamber 36. In addition, the pressure in the tank 62 can be adjusted to provide a desired braking torque upon engagement of the brake assembly 8.

It is contemplated that the fluid pressure which is conducted to the tank 62 and the chamber 36 may be varied to compensate wear of the friction material on the brake disc, loss of strength by the springs 45, the torque transmitting capabilities resistance of the machine input shaft 11 and/or other factors. By properly adjusting the air pressure conducted to the tank 62, the brake assembly 8 can be smoothly engaged with a minimum of shock loading on the machine input shaft 11. However, the combined influence of the fluid pressure in the chamber 36 and the biasing springs 45 will enable the brake assembly 8 to be quickly operated between an engaged condition and a disengaged condition during operation of the coupling assembly 6 while the machine 12 is operating at a relatively high rate, for example, between 300 and 400 cycles per second.

In order to operate the brake assembly 8 to the engaged condition, the clutch assembly 7 must be operated to the disengaged condition. In order to operate the clutch assembly 7 to the disengaged condition, fluid pressure must be exhausted from the chamber 35. This is because expansion of the chamber 36 to move the brake plate 28 into engagement with the brake disc 14 requires the chamber 35 to be contracted.

If fluid pressure is maintained in the chamber 35 longer than is necessary, the fluid pressure in the chamber 35 will oppose engagement of the brake assembly 8 and retard high speed operation of the clutch assembly 7. In addition, the harder it is to exhaust the fluid pressure in the chamber 35, the greater must be the fluid pressure in the chamber 36 t effect actuation of the brake assembly 8. Of course, increasing the fluid pressure in the chamber 36 increases the force with which the brake assembly 8 is actuated and thereby tends to increase shock loading on the machine input shaft 11 and the brake torque applied to the machine input shaft 11. In order to minimize the fluid pressure required in the chamber 36 to promote both a rapid and gentle operation of the brake assembly 8 to the engaged condition, the fluid pressure must be exhausted from the chamber 35 with a minimum of resistance.

In order to promote rapid depressurization of the chamber 35 when the clutch assembly 7 is to be disengaged and the brake assembly 8 is to be engaged, a plurality of quick release valves 82 are provided immediately adjacent to the chamber 35. By providing a plurality of quick release valves 82, each of which is connected with the chamber 35 by separate passage 39, depressurization of the chamber 35 is facilitated. Although only one quick release valve 82 has been illustrated in FIG. 1, it is contemplated that a plurality of quick release valves will be connected to the chamber 35 through a plurality of passages 39.

It is contemplated that the quick release valves 82 may be many different constructions. However, it is presently preferred to construct and interconnect the quick release valves 82 in the same manner as is disclosed in U.S. Pat. No. 4,874,068 issued Oct. 17, 1989 and entitled "Clutch and Brake Rapid Exhaust Manifold". Of course, if desired, quick release valves 82 having a different construction could be utilized. It should also be understood that although it is preferred to provide the quick release valves 82 in association with the same passage 39 through which fluid pressure is conducted to the chamber 35, one group of passages can be provided to conduct fluid pressure to the chamber 35 and a separate group of passages could be provided in association with the quick release valves 82 to exhaust fluid pressure from the chamber 35.

The combination of the quick release valve 82 to effect rapid depressurization of the chamber 35 and the use of relatively low air pressure in the chamber 36 to assist the biasing springs 45 in actuating the brake assembly 8 to the engaged condition enables the brake assembly to be quickly and smoothly engaged to transmit a desired amount of braking torque to the machine input shaft 11. The pressure regulator valve 74 can be adjusted to enable the desired braking torque to be maintained after the coupling 6 has to be used for a relatively long period of time. By providing for a controlled actuation of the brake assembly 8 from the disengaged condition to the engaged condition along with a simultaneous actuation of the clutch assembly 7 from the engaged condition to the disengaged condition, rotation of the machine input shaft 11 can be quickly stopped with a minimum of shock loading on the components of the coupling assembly 6 thereby to increase the operating life of the coupling assembly. Reducing the shock load on the components of the coupling assembly 6 also reduces the stresses to which the shaft 11 and components of the machine 12 are subjected to thereby tend to increase the operating life of the machine.

The flow of air from the tanks 60 and 62 to the coupling assembly 6 is controlled by a pair of solenoid valves 88 and 90. The solenoid valve 88 is provided between the air tank 60 and the chamber 35. The solenoid valve 88 is normally in the unactuated condition shown in FIG. 1. When the solenoid valve 88 is in the unactuated condition of FIG. 1, the chamber 35 and the quick release exhaust valve 82 are exhausted to atmosphere. Upon energization of a solenoid 94, the valve 88 is operated to an actuated condition in which the air tank 60 is connected with the chamber 35 to effect operation of the brake assembly to a disengaged condition and operation of the clutch assembly to an engaged condition.

The solenoid valve 90 is generally similar to the solenoid valve 88. However, when the solenoid valve 90 is in its normal or unactuated condition, the tank 62 is connected in fluid communication with the chamber 36. Upon energization of a solenoid 96, the valve 90 is operated to an actuated condition in which the chamber 36 is exhausted to atmosphere. The solenoids 94 and 96 are simultaneously energized or deenergized to effect simultaneous operation of the valves 88 and 90.

In the event of a power failure, the valves 88 and 90 assume the normal positions shown in FIG. 1. Thus, in the event of a power failure, the valve 88 effectively exhausts the chamber 35 to atmosphere by venting the quick release valves 82 to enable the clutch assembly 7 to be disengaged. At the same time, the valve 90 connects the chamber 36 with the tank 62 to enable any residual air pressure in the tank 62 to assist the springs 45 in operating the brake assembly 8 to the engaged condition. This results in the coupling assembly being effective to hold the output shaft 11 to the machine 12 against rotation in the event of a power failure.

The valves 88 and 90 are connected with the chambers 35 and 36 through a manifold 102. The manifold 102 has an inner core body section which is connected with the hub 10 for rotation therewith. In addition, the manifold 102 has an outer sleeve or housing which is stationary and is connected with the solenoid valves 88 and 90. The general construction of the manifold 102 and the manner in which it cooperates with the coupling 8 is the same as is disclosed in the aforementioned U.S. Pat. No. 4,874,068. Since the manifold 102 has two passages, that is one for air to be conducted from the valve 88 to the chamber 35 and one for air to be conducted from the valve 90 to the chamber 36, it is preferred to utilize a manifold assembly having the same construction as an FDA Rotor Seal which is commercially available from Airflex Division of Eaton Corporation, having a place of business at 9919 Clinton Road, Cleveland, Ohio 44144.

CONCLUSION

In view of the foregoing description, it is apparent that the present invention provides a new and improved coupling assembly 6. The coupling assembly 6 includes a brake disc 14 which is maintained stationary and a clutch disc 13 which is constantly rotated. A brake element 28 is engageable with the brake disc 14 to hold a member 11 against rotation. A clutch element 42 is engageable with the clutch disc 13 to transmit force to rotate the output member 11. The brake element 28 is urged toward the brake disc 14 and the clutch element 42 is urged away from the clutch disc 13 by a biasing spring 45. Fluid pressure is conducted to a first chamber 36 to assist the biasing spring 45 in urging the brake element 28 toward the brake disc 14 and the clutch element 42 away from the clutch disc 13. Fluid pressure is conducted to a second chamber 35 to urge the clutch element 42 toward the clutch disc 13 and to urge the brake element 28 away from the brake disc 14 against the influence of the biasing spring 45.

Fluid is supplied at a first pressure to the first chamber 36 by a first fluid pressure supply 60 to assist the spring 45 in urging the brake element 28 toward the brake disc 14. A second fluid pressure is supplied to the second chamber 35 to urge the clutch element 42 toward the clutch disc 13 and to urge the brake element 28 away from the brake disc 14 against the influence of the biasing spring 45. The second fluid pressure is greater than the first fluid pressure to prevent engagement of the brake element 28 with the brake disc 14 under the influence of excessive force provided by the combined effect of the biasing spring 45 and the fluid pressure in the first chamber 36.

Having described the invention, the following is claimed:

1. A coupling assembly comprising a rotatable output member, a stationary brake disc, a clutch disc which is adapted to be constantly rotated, a brake element connected with said output member for rotation therewith and engageable with said brake disc to hold said output member against rotation, a clutch element connected with said output member for rotation therewith, said clutch element being engageable with said clutch disc to transmit force to rotate said output member, spring means for providing force urging said brake element toward said brake disc and urging said clutch element away from said clutch disc, first chamber means for holding fluid pressure to assist said spring means in urging said brake element toward said brake disc and said clutch element away from said clutch disc, second chamber means for holding fluid pressure to urge said clutch element toward said clutch disc and to urge said brake element away from said brake disc against the influence of said spring means, first fluid pressure supply means for supplying fluid at a first pressure to said first chamber means, second fluid pressure supply means for supplying fluid at a second pressure to said second chamber means, said second fluid pressure being greater than said first fluid pressure, and valve means for rendering said first fluid pressure supply means ineffective to supply fluid at the first pressure to said first chamber means when said second fluid pressure supply means is effective to supply fluid at the second fluid pressure to said second chamber means and for rendering said second fluid pressure supply means ineffective to supply fluid at the second pressure to said second chamber means when said first fluid pressure supply means is effective to supply fluid at the first fluid pressure to said first chamber means.

2. A coupling assembly as set forth in claim 1 wherein said second fluid pressure is at least twice as great as said first fluid pressure.

3. A coupling assembly as set forth in claim 1 wherein further including quick release valve means for exhausting fluid pressure in said second chamber means to atmosphere, said first chamber means being expansible under the influence of the first fluid pressure to force air from said second chamber means through said quick release valve means.

4. A coupling assembly as set forth in claim 1 wherein said first fluid pressure supply means includes pressure regulation means which is adjustable to enable the fluid pressure conducted to said first chamber means to be varied.

5. A coupling assembly comprising a rotatable output member, a stationary brake disc, a clutch disc which is adapted to be constantly rotated, a brake element connected with said output member for rotation therewith and engageable with said brake disc to hold said output member against rotation, a clutch element connected with said output member for rotation therewith, said clutch element being engageable with said clutch disc to transmit force to rotate said output member, spring means for providing force urging said brake element toward said brake disc and urging said clutch element away from said clutch disc, first chamber means for holding fluid pressure to assist said spring means in urging said brake element toward said brake disc and said clutch element away from said clutch disc, second chamber means for holding fluid pressure to urge said clutch element toward said clutch disc and to urge said brake element away from said brake disc against the influence of said spring means, a source of fluid pressure, first tank means connected with said source of fluid pressure for holding fluid received from said source of fluid pressure at a first pressure, first conduit means for conducting fluid at the first pressure from said first tank means to said first chamber means to urge said brake element toward said brake disc and said clutch element away from said clutch disc under the combined influence of said spring means and the first fluid pressure in said first chamber means, second tank mean connected with said source of fluid pressure for holding fluid received from said source of fluid pressure at a second pressure which is greater than said first pressure, and second conduit means for conducting fluid at the second pressure from said second tank means to said second chamber means to urge said clutch element toward said clutch disk and to urge said brake element away from said brake disc against the influence of said spring means and under the influence of the second fluid pressure in said second chamber means.

6. A coupling assembly as set forth in claim 5 further including valve means for rendering said first fluid pressure supply means ineffective to supply fluid at the first pressure to said first chamber means when said second fluid pressure supply means is effective to supply fluid at the second fluid pressure to said second chamber means and for rendering said second fluid pressure supply means ineffective to supply fluid at the second pressure to said second chamber means when said first fluid pressure supply means is effective to supply fluid at the first fluid pressure to said first chamber means.

* * * * *